(12) United States Patent
Moon et al.

(10) Patent No.: US 11,524,394 B2
(45) Date of Patent: Dec. 13, 2022

(54) DISASSEMBLING TOOL AND BATTERY MODULE USING DISASSEMBLING TOOL

(71) Applicant: LG Chem, Ltd., Seoul (KR)

(72) Inventors: Duck-Hee Moon, Daejeon (KR);
Do-Hyeon Kim, Daejeon (KR);
Sung-Chun Yu, Daejeon (KR);
Tae-Young Kang, Daejeon (KR)

(73) Assignee: LG ENERGY SOLUTIONS, LTD., Seoul (KR)

( * ) Notice: Subject to any disclaimer, the term of this patent is extended or adjusted under 35 U.S.C. 154(b) by 347 days.

(21) Appl. No.: 16/631,747

(22) PCT Filed: Nov. 8, 2018

(86) PCT No.: PCT/KR2018/013570
§ 371 (c)(1),
(2) Date: Jan. 16, 2020

(87) PCT Pub. No.: WO2019/117474
PCT Pub. Date: Jun. 20, 2019

(65) Prior Publication Data
US 2020/0230788 A1 Jul. 23, 2020

(30) Foreign Application Priority Data

Dec. 15, 2017 (KR) ........................ 10-2017-0173520

(51) Int. Cl.
*H01M 50/20* (2021.01)
*H01M 50/204* (2021.01)
(Continued)

(52) U.S. Cl.
CPC ........ *B25B 23/0035* (2013.01); *B25B 13/481* (2013.01); *H01M 50/20* (2021.01);
(Continued)

(58) Field of Classification Search
CPC ............. H01M 50/20; H01M 2220/20; H01M 10/0481; H01M 50/204; H01M 50/244;
(Continued)

(56) References Cited

U.S. PATENT DOCUMENTS 3,418,828 A 12/1968 Carns
5,167,395 A * 12/1992 Pearman ................. B60R 16/04
248/500

(Continued)

FOREIGN PATENT DOCUMENTS

CN 103038915 A 4/2013
CN 203418477 U 2/2014
(Continued)

OTHER PUBLICATIONS

Extended European Search Report for European Application No. 18888838.2, dated Mar. 5, 2021.
(Continued)

*Primary Examiner* — Imran Akram
(74) *Attorney, Agent, or Firm* — Birch, Stewart & Birch, LLP (57) ABSTRACT

Disclosed is a disassembling tool for a secondary battery. The disassembling tool includes a first rotation member configured to be rotatable and to allow a nut to be coupled thereto; a connection shaft coupled to the first rotation member; a second rotation member coupled to the connection shaft to transmit a rotational force to the connection shaft; and a housing, in which the connection shaft is disposed. The housing is inclined with respect to a virtual horizontal line parallel to a ground surface.

3 Claims, 6 Drawing Sheets

(51) Int. Cl.
  *H01M 50/517* (2021.01)
  *B25B 23/00* (2006.01)
  *B25B 13/48* (2006.01)
  *H01M 50/505* (2021.01)

(52) U.S. Cl.
  CPC ....... *H01M 50/204* (2021.01); *H01M 50/505* (2021.01); *H01M 50/517* (2021.01)

(58) Field of Classification Search
  CPC .. H01M 10/02; H01M 50/147; H01M 50/264; H01M 50/517
  See application file for complete search history.

(56) References Cited

U.S. PATENT DOCUMENTS

| | | | |
|---|---|---|---|
| 2007/0053754 A1 | 3/2007 | Hartranft et al. | |
| 2007/0259723 A1 | 11/2007 | Bertani | |
| 2011/0197719 A1 | 8/2011 | Neitzell et al. | |
| 2012/0021271 A1 | 1/2012 | Tople et al. | |
| 2013/0183573 A1* | 7/2013 | Yoshioka | H01M 50/35 429/159 |
| 2013/0288094 A1* | 10/2013 | Noh | H01M 50/209 429/99 |
| 2014/0187338 A1 | 7/2014 | Chen | |
| 2014/0239904 A1 | 8/2014 | Tanaka et al. | |
| 2015/0089981 A1* | 4/2015 | Renfro | E05B 73/00 70/164 |
| 2016/0056427 A1 | 2/2016 | Kim et al. | |
| 2016/0218388 A1* | 7/2016 | Kim | H01M 10/4257 |
| 2016/0372736 A1* | 12/2016 | Kim | H01M 50/507 |
| 2018/0175351 A1* | 6/2018 | Kim | F16B 43/003 |
| 2018/0190965 A1 | 7/2018 | Lee et al. | |
| 2018/0331337 A1* | 11/2018 | Zhu | H01M 50/209 |
| 2020/0259142 A1* | 8/2020 | Yin | B60L 50/64 |

FOREIGN PATENT DOCUMENTS

| | | |
|---|---|---|
| CN | 103659681 A | 3/2014 |
| CN | 105215898 A | 1/2016 |
| DE | 10 2012 020 035 A1 | 4/2013 |
| FR | 2 869 252 A1 | 10/2005 |
| JP | 2000-000776 A | 1/2000 |
| JP | 2010-104931 A | 5/2010 |
| JP | 2011-144821 A | 7/2011 |
| JP | 2013-121653 A | 6/2013 |
| JP | 2016-508659 A | 3/2016 |
| KR | 10-2001-0057600 A | 7/2001 |
| KR | 10-2001-0063542 A | 7/2001 |
| KR | 10-2008-0025424 A | 3/2008 |
| KR | 20-0443422 Y1 | 2/2009 |
| KR | 10-2015-0134640 A | 12/2015 |
| KR | 10-1674348 B1 | 11/2016 |
| KR | 10-2017-0050509 A | 5/2017 |
| KR | 10-2017-0054878 A | 5/2017 |
| WO | WO 2017/104942 A1 | 6/2017 |

OTHER PUBLICATIONS

European Office Action dated Oct. 19, 2022 for Application No. 18888838.2.

* cited by examiner

DISASSEMBLING TOOL AND BATTERY MODULE USING DISASSEMBLING TOOL

CROSS-REFERENCES TO RELATED APPLICATIONS

This application is a U.S. national phase application, pursuant to 35 U.S.C. § 371, of PCT/KR2018/013570, filed Nov. 8, 2018, designating the United States, which claims priority to Korean Application No. 10-2017-0173520, filed Dec. 15, 2017. The entire contents of the aforementioned patent applications are incorporated herein by this reference.

The present application claims the benefit of priority to Korean Patent Application No. 10-2017-0173520 filed on Dec. 15, 2017, which application is incorporated herein by reference in its entirety.

TECHNICAL FIELD

The present disclosure relates to a disassembling tool and a battery module using the disassembling tool, and more particularly, to a disassembling tool capable of separating a target object by disassembling a hidden nut from a hidden bolt, and a battery module used with the disassembling tool.

BACKGROUND ART

As technology has developed, and demand for a mobile device have increased, demand for a secondary battery as an energy source has rapidly increased. Conventionally, a nickel-cadmium battery or a hydrogen ion battery has been used as the secondary battery. Recently, a lithium secondary battery is widely used since charging and discharging is flexible due to a minimum memory effect in comparison with a nickel-based secondary battery, a self-discharge rate is significantly lower, and an energy density is higher.

The lithium secondary battery generally uses a lithium oxide and a carbonaceous material as a positive electrode active material and a negative electrode active material, respectively. The lithium secondary battery includes an electrode assembly in which a positive electrode plate and a negative electrode plate, respectively coated with the positive electrode active material and the negative electrode active material, are arranged with a separator therebetween, and an outer member (e.g., a battery case), which seals and receives the electrode assembly with an electrolyte solution.

The lithium secondary battery includes a positive electrode, a negative electrode, and a separator interposed therebetween and an electrolyte. Depending on which material is used for the positive electrode active material and the negative electrode active material, the lithium secondary battery is classified into a lithium ion battery (LIB) and a polymer lithium ion battery (PLIB). Generally, an electrode of the lithium secondary battery is prepared by applying the positive or negative electrode active material to a current collector made of aluminum or copper sheet, mesh, film, foil, or the like and then drying the same.

The battery module includes battery cells with high energy. The battery module poses minimum safety problems due to insulation or protection circuit operation. However, when the battery module is disassembled, a short circuit may occur due to various conductor members inside the battery module, and also a fire may occur in the battery module.

To solve this problem, among a plurality of bolts and nuts that fix the battery cells inside the battery module, only some bolts and nuts are exposed to the outside, and the remaining bolts and nuts may be provided to be hidden. In the battery module, the hidden nuts are unable to be disassembled from the bolts using a general disassembling tool, which prevents the battery module from being disassembled by unspecified persons.

However, a manager who manages the battery module should disassemble the battery module when necessary. In this case, since some of the bolts and nuts are hidden and thus the battery cells may be not disassembled from the battery module as described above, the management of the battery module may become impossible.

DISCLOSURE

Technical Problem

The present disclosure is directed to providing a battery module, which may prevent the battery module from being disassembled by unspecified persons other than a manager since some of a plurality of bolts and a plurality of nuts are unexposed to the outside.

In addition, the present disclosure is directed to providing a disassembling tool, which may be coupled to hidden nuts among the plurality of bolts and the plurality of nuts to allow the hidden nuts to be disassembled from the bolts.

In addition, the present disclosure is directed to providing a battery module using the disassembling tool, which may disassemble hidden nuts from the bolts and allow battery cells to be easily separated from a case.

Technical Solution

In one aspect of the present disclosure, a disassembling tool includes a first rotation member configured to be rotatable and to allow a nut to be coupled thereto; a connection shaft coupled to the first rotation member; a second rotation member coupled to the connection shaft to transmit a rotational force to the connection shaft; and a housing, in which the connection shaft is disposed. The housing is inclined to have an inclination angle with respect to a virtual horizontal line parallel to a ground surface.

Further, the first rotation member and the connection shaft may be coupled using a first universal joint, and the second rotation member and the connection shaft may be coupled using a second universal joint.

In addition, the first rotation member and the second rotation member may be formed parallel to each other.

Further, a coupling groove may be formed at an outer surface of the housing to be coupled to a coupling protrusion of a target object.

In addition, the coupling groove may be formed in a longitudinal direction parallel to the inclination angle of the housing.

Meanwhile, according to another aspect of the present disclosure, a battery module includes a battery cell stack having a plurality of battery cells provided with electrode leads to allow the plurality of battery cells to be stacked on each other; a case configured to accommodate the battery cell stack to allow the battery cell stack to be coupled thereto by a plurality of bolts and a plurality of nuts; and an interconnect board (ICB) cover fixedly coupled at an upper side of the battery cell stack to expose a part of the plurality of bolts and the plurality of nuts to outside. In the battery module, among the plurality of bolts and the plurality of nuts, a nut hidden by the ICB cover is capable of being disassembled from its corresponding bolt by the disassembling tool described above.

Further, a coupling groove may be formed at an outer surface of the housing of the disassembling tool, and a coupling protrusion may be formed on at least one side of the case to be coupled to the coupling groove of the disassembling tool.

In addition, a guide protrusion may be formed at the case to guide movement of the disassembling tool to allow the coupling groove of the disassembling tool to be coupled to the coupling protrusion.

Further, the guide protrusion may include a first rib having a first inclination angle that is same as the inclination angle of the housing of the disassembling tool, and a second rib that extends from the first rib and has a second inclination angle different from the first inclination angle of the first rib.

In addition, the second inclination angle of the second rib may be greater than the first inclination angle of the first rib with respect to a bottom portion of the case forming an acute angle.

Meanwhile, according to another aspect of the present disclosure, a battery pack includes the battery module described above.

Advantageous Effects

According to exemplary embodiments of the present disclosure, since the interconnect board (ICB) cover fixedly coupled to an upper side of the battery cell stack prevents some bolts and nuts among a plurality of bolts and a plurality of nuts from being exposed to the outside, the battery module may be prevented from being disassembled by unspecified persons other than a manager.

In addition, the disassembling tool may be coupled to hidden nuts among the plurality of bolts and the plurality of nuts to allow the hidden nuts to be disassembled from the bolts.

In addition, the hidden nuts may be disassembled from the bolts using the disassembling tool, and battery cells included in the battery module may be easily separated from the case.

BEST MODE

Hereinafter, preferred exemplary embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

In the drawings, the size of each element or a specific part of the element may be exaggerated, omitted, or schematically illustrated for convenience and clarity of a description. Thus, the size of each element does not entirely reflect the actual size of the element. A detailed description of well-known functions or elements associated with the present disclosure will be omitted if it unnecessarily obscures the subject matter of the present disclosure.

The term, 'combine' or 'connect' as used herein, may refer not only to a case where one member and another member are directly combined or directly connected but also a case where one member is indirectly combined with another member via a connecting member or is indirectly connected.

Figure 1:
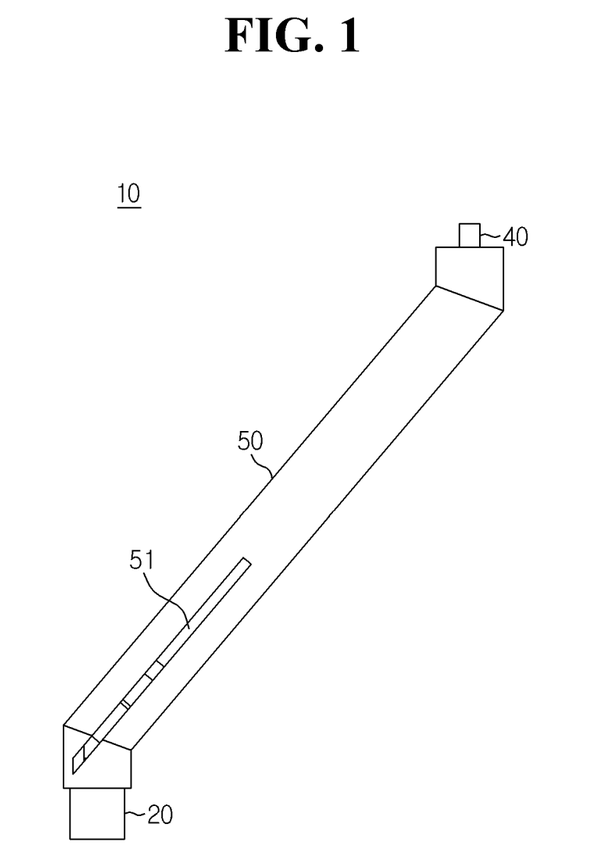
FIG. 1 is a schematic front view showing a disassembling tool according to an exemplary embodiment of the present disclosure.
Figure 2:
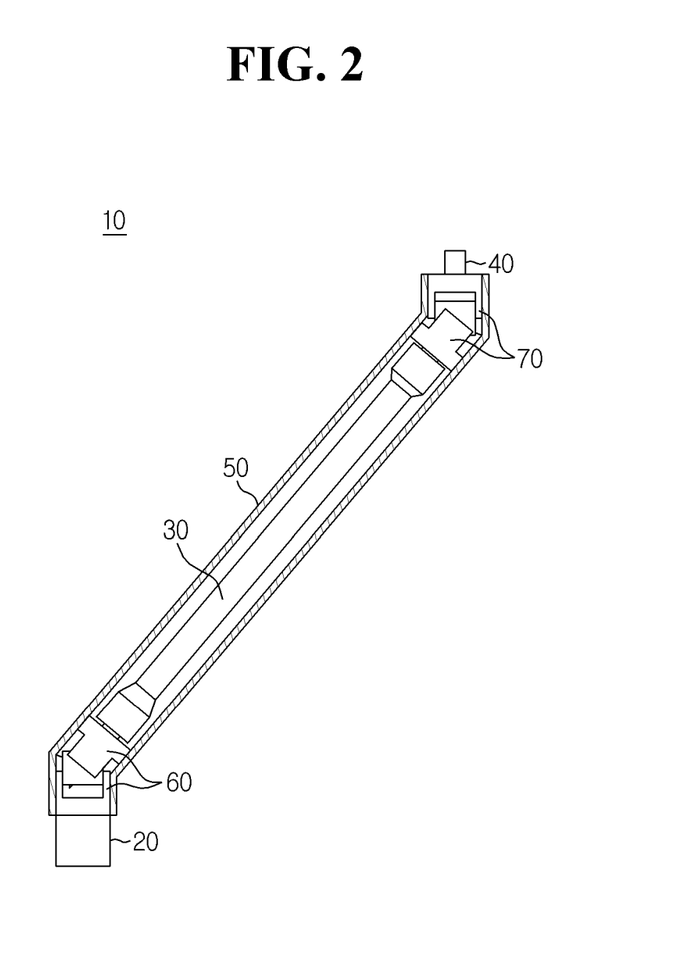
FIG. 2 is a cross-sectioned view of FIG. 1.

FIG. 1 is a schematic front view showing a disassembling tool according to an exemplary embodiment of the present disclosure, and FIG. 2 is a cross-sectioned view of FIG. 1.

Referring to FIGS. 1 and 2, a disassembling tool 10 according to an exemplary embodiment of the present disclosure includes a first rotation member 20, a connection shaft 30, a second rotation member 40, and a housing 50.

The first rotation member 20 may be rotatable, and a nut may be coupled to the first rotation member 20. In other words, when a rotational force is transmitted through the connection shaft 30 coupled to the first rotation member 20, the first rotation member 20 may rotate together with the connection shaft 30 so that the nut coupled to an end thereof is rotated to separate a nut from a bolt or fasten a nut to a bolt. The first rotation member 20 may be shaped corresponding to the shape of the nut to be coupled to the nut. The first rotation member 20 may include a magnet at least in part. In other words, when the nut is disassembled, the nut may be attached to the first rotation member 20 made of a magnet and transferred to the outside. When the nut is fastened, the nut may be attached to the first rotation member 20 due to the magnet and then be contacted and fastened to the bolt.

A first end of the connection shaft 30 is coupled to the first rotation member 20, and a second end is coupled to the second rotation member 40. The rotational force is transmitted from the second rotation member 40 to the connection shaft 30 to allow the connection shaft 30 to be rotated, and to also allow the first rotation member 20 coupled to the connection shaft 30 to be rotated due to the rotation of the connection shaft 30. The connection shaft 30 is disposed within the housing 50.

The second rotation member 40 is coupled to the connection shaft 30 to transmit the rotational force to the connection shaft 30. The second rotation member 40 may be coupled to various devices or the like that is capable of providing a rotational force. For example, the second rotation member 40 may be coupled to a rotational power source having various motors and may be rotated by a rotational force provided by the rotational power source. Alternatively, a worker may manually rotate the second rotation member 40 by coupling various tools such as a wrench thereto. Referring to FIGS. 1 and 2, the second rotation member 40 may be formed to be aligned with the first rotation member 20, for example, parallel to the first rotation member 20.

Referring to FIG. 2, a connection shaft 30 is disposed within the housing 50. In addition, at least a portion of the first rotation member 20 is exposed out of the housing 50 through a first end of the housing 50, and at least a portion of the second rotation member 40 is exposed out of the housing 50 through a second end of the housing 50. The housing 50 is inclined with respect to a virtual horizontal line parallel to the ground surface. The ground surface is a concept including not only the actual ground surface but also a bottom surface, and the housing 50 may be inclined with respect to a virtual horizontal line parallel to the bottom portion of various devices or systems, which correspond to a disassembly target object. If the housing 50 is inclined as described above, even when the nut is hidden by a cover or the like, it is possible to access the hidden nut and then disassemble or fasten the nut. This will be described later in detail in relation to a battery module 100 using the disassembling tool according to an exemplary embodiment of the present disclosure.

Referring to FIG. 1, a coupling groove 51 may be formed at an outer surface of the housing 50 to be coupled to a coupling protrusion of the target object. As the coupling groove 51 of the housing 50 is coupled to the coupling protrusion of the target object, the first rotation member 20 may be correctly coupled to the nut. If the disassembling tool 10 does not have the coupling groove 51 formed at the housing 50, the outer surface of the housing 50 and the coupling protrusion of the target object may interfere with each other to hinder the first rotation member 20 from being coupled to the nut, thereby making it impossible to disassemble or fasten the nut. In other words, due to the coupling protrusion formed on the target object, the first rotation member 20 may be correctly coupled to the nut only when the coupling groove 51 is formed at the housing 50. In particular, the coupling groove 51 may be formed in a longitudinal direction aligned with the inclination of the housing 50, for example, parallel to the inclination of the housing 50.

Universal joints 60 and 70 include a first universal joint 60 and a second universal joint 70, respectively. Referring to FIG. 2, the first universal joint 60 couples the first rotation member 20 and the connection shaft 30, and the second universal joint 70 couples the second rotation member 40 and the connection shaft 30. Although the housing 50 is inclined as described above, it is possible to couple the first rotation member 20 and the connection shaft 30, and to couple the second rotation member 40 and the connection shaft 30, respectively, by means of the first universal joint 60 and the second universal joint 70. In addition, the rotational force from the rotation member 40 may be transmitted to the first rotation member 20 via the connection shaft 30.

Hereinafter, the operations and effects of the disassembling tool 10 according to an exemplary embodiment of the present disclosure will be described with reference to the figures.

Referring to FIGS. 1 and 2, the connection shaft 30 is disposed within the housing 50 which is inclined with respect to the virtual vertical line parallel to the ground surface, and the first rotation member 20 and the second rotation member 40 are coupled to both ends of the connection shaft 30, respectively. In particular, the first rotation member 20 and the connection shaft 30 are coupled via the first universal joint 60, and the second rotation member 40 and the connection shaft 30 are coupled via the second universal joint 70. As the first rotation member 20, the connection shaft 30, and the second rotation member 40 are coupled via the universal joints 60, 70 as described above, the rotational force may be transmitted from the second rotation member 40 to the first rotation member 20 via the connection shaft 30 although the housing 50 in which the connection shaft 30 is disposed is inclined. In addition, since a nut may be coupled to the first rotation member 20, when the first rotation member 20 rotates, the nut coupled to the first rotation member 20 may be disassembled from the bolt or fastened to the bolt.

Meanwhile, the coupling groove 51 may be formed at the outer surface of the housing 50, and the coupling protrusion may be formed on the target object, which the nut is to be disassembled from or fastened to. In this case, when the coupling groove 51 formed at the outer surface of the housing 50 is coupled to the coupling protrusion of the target object, the first rotation member 20 may be coupled to the nut at a correct position of the nut. In other words, if the coupling protrusion is formed at the target object, it is impossible to disassemble or fasten the nut using a disassembling tool 10 having the housing 50 with no coupling groove 51, thereby preventing the target object from being disassembled by unspecified persons.

Figure 3:
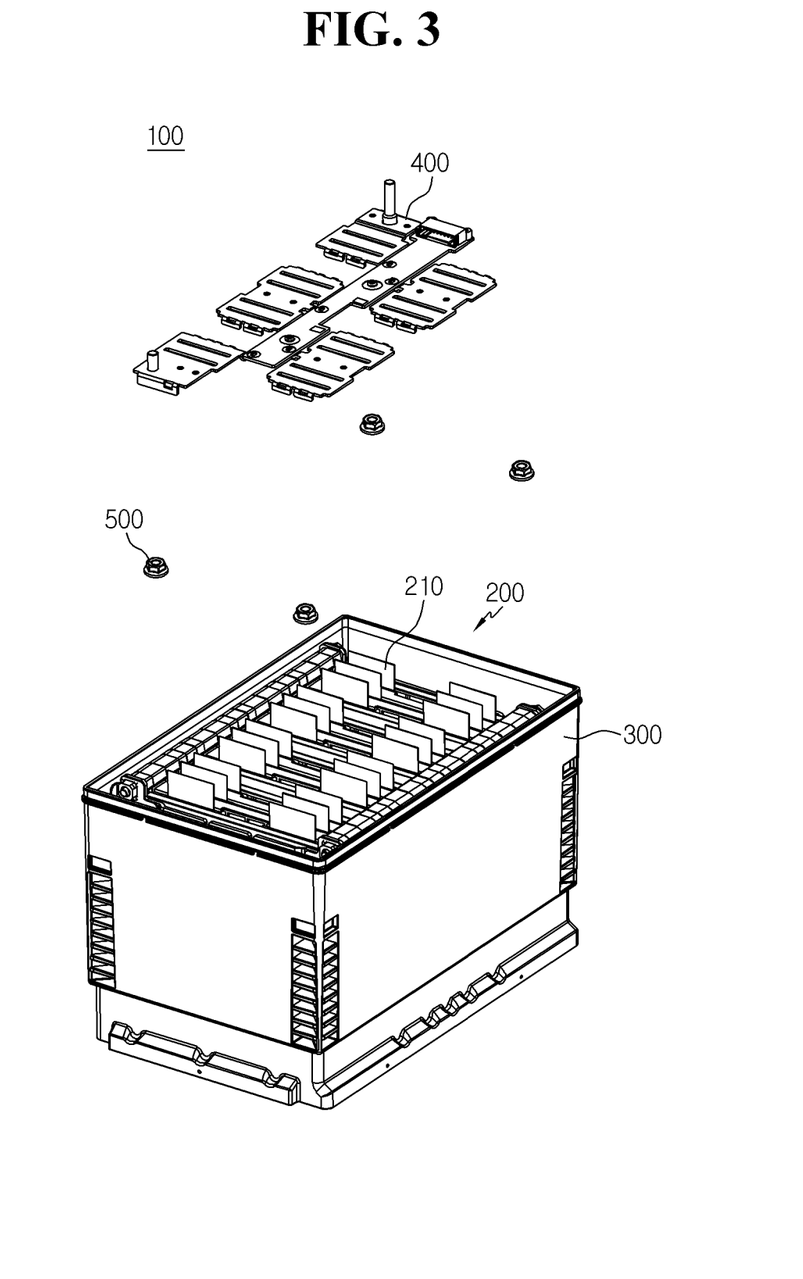
FIG. 3 is an exploded perspective view showing a battery module using the disassembling tool according to an exemplary embodiment of the present disclosure.
Figure 4:
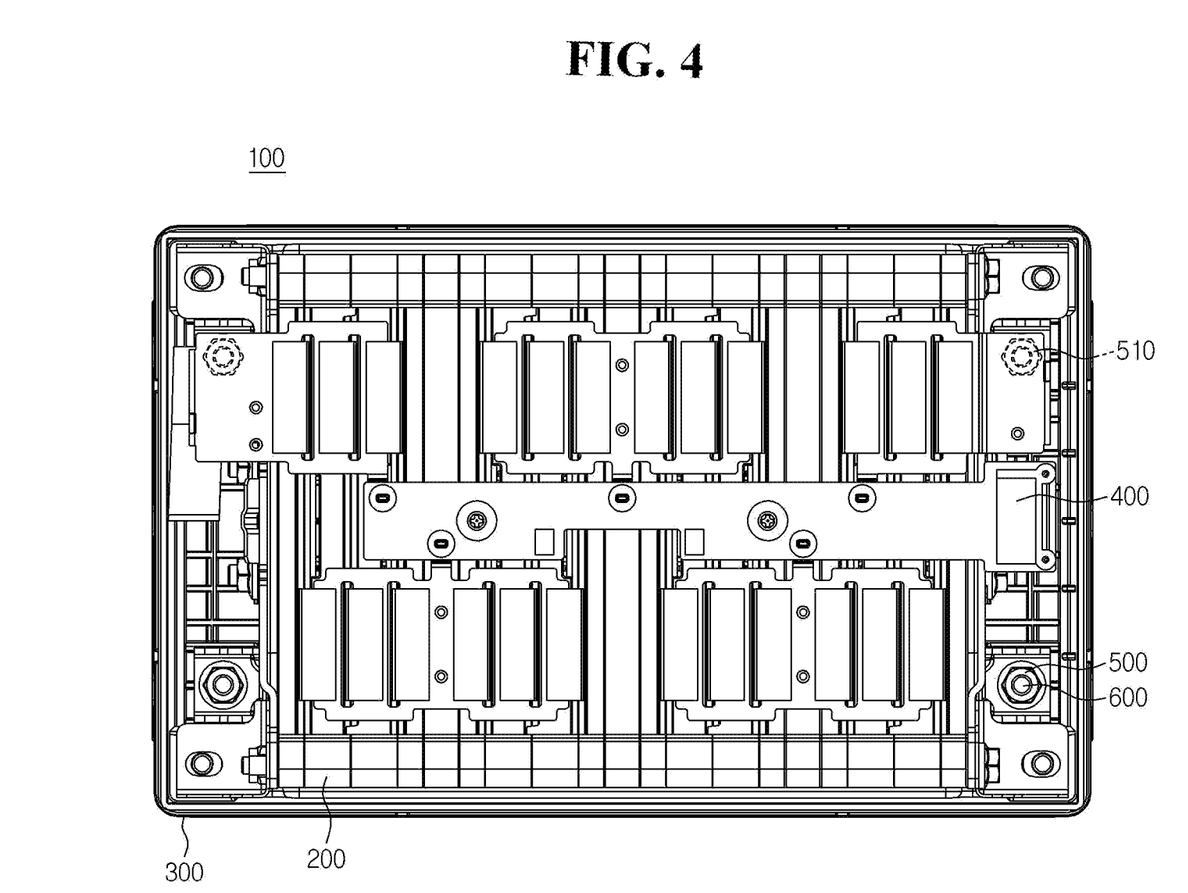
FIG. 4 is a plan view showing the ICB cover coupled to the battery cell in FIG. 3.
Figure 5:
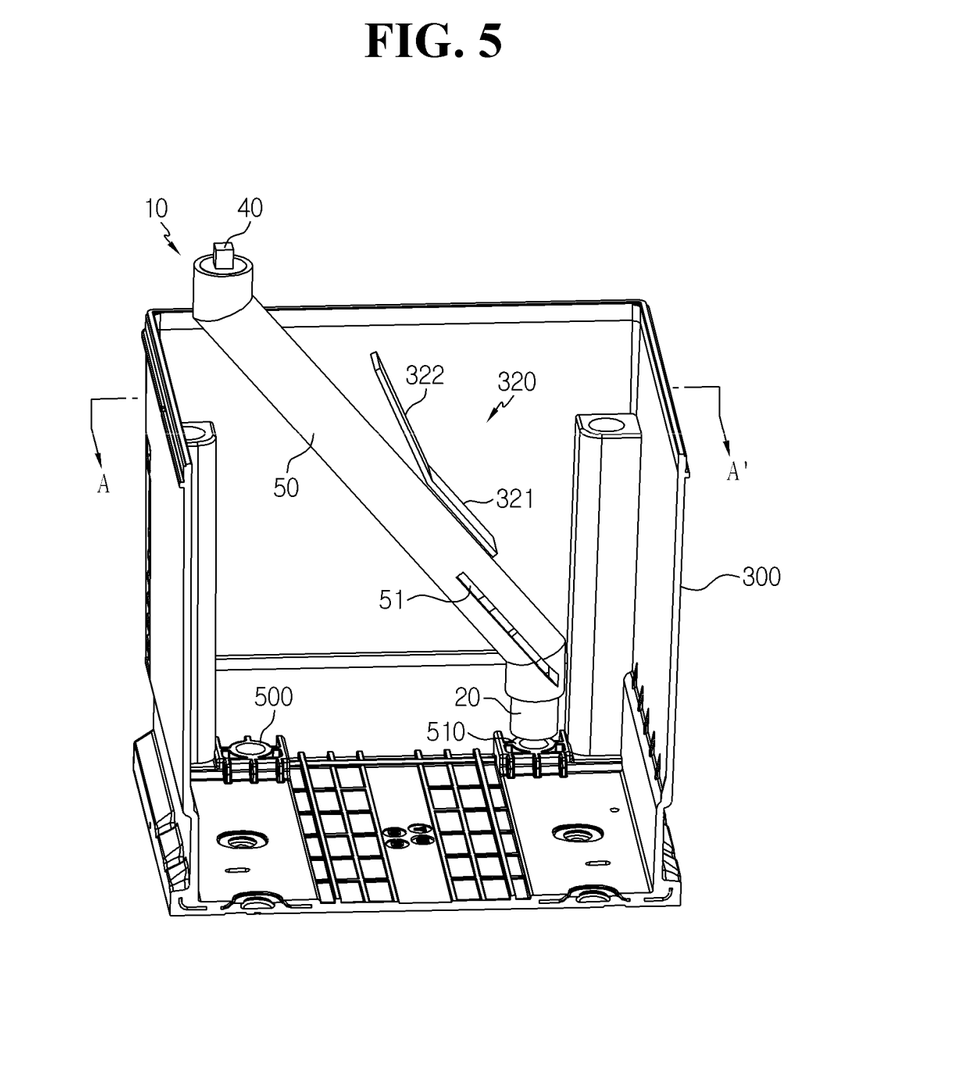
FIG. 5 is a sectioned perspective view showing a case in which the disassembling tool is coupled to a hidden nut, at the battery module using the disassembling tool according to an exemplary embodiment of the present disclosure.
Figure 6:
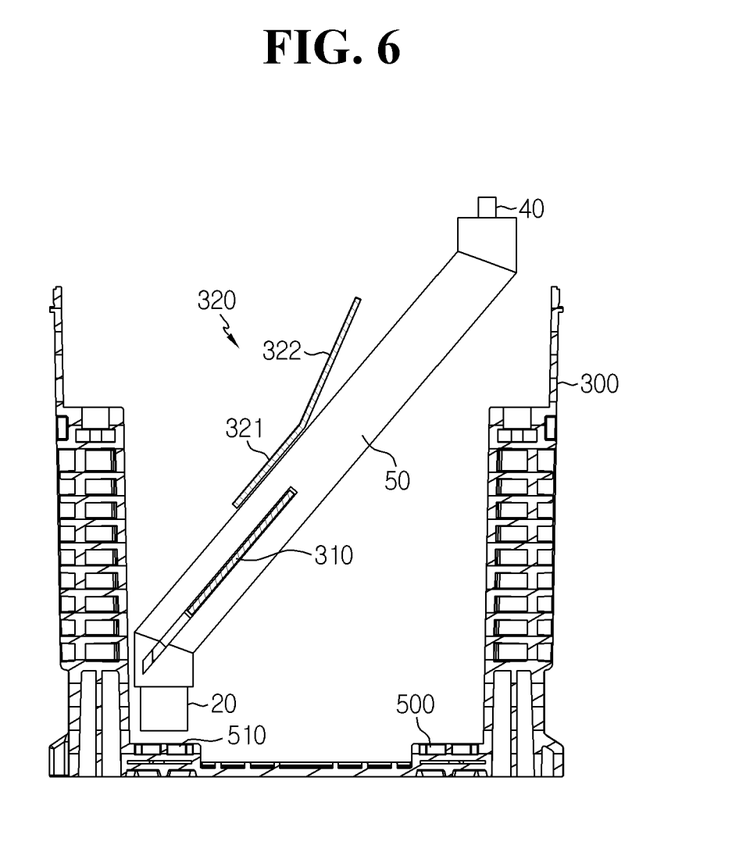
FIG. 6 is a cross-sectional view, taken along the line A-A' of FIG. 5.

FIG. 3 is an exploded perspective view showing a battery module using the disassembling tool according to an exemplary embodiment of the present disclosure, FIG. 4 is a plan view showing the ICB cover coupled to the battery cell in FIG. 3, FIG. 5 is a sectioned perspective view showing a case in which the disassembling tool is coupled to a hidden nut, at the battery module using the disassembling tool according to an exemplary embodiment of the present disclosure, and FIG. 6 is a cross-sectional view, taken along the line A-A' of FIG. 5.

Hereinafter, the operations and effects of a battery module 100 using the disassembling tool according to an exemplary embodiment of the present disclosure will be described with reference to the figures. However, the features already explained in relation to the disassembling tool 10 according to an exemplary embodiment of the present disclosure will not be described in detail again.

The target object that needs a nut to be disassembled or fastened by the disassembling tool 10 described above may be diverse, and the target object may be, for example, a battery module 100. Hereinafter, a battery module 100 that allows a nut to be disassembled or fastened using the disassembling tool 10 will be described.

The battery module 100 that requires the use of a disassembling tool according to an exemplary embodiment of the present disclosure includes a battery cell stack 200, a case 300, and an interconnect board (ICB) cover 400.

The battery cell stack 200 includes a plurality of battery cells provided with electrode leads 210. The electrode lead 210 provided at the battery cell is some type of terminal that is exposed to the outside and connected to an external device, and may be made of a conductive material. The electrode lead 210 may include a positive electrode lead and a negative electrode lead. The positive electrode lead and the negative electrode lead may be disposed at opposite sides in the longitudinal direction of the battery cell, or the positive electrode lead and the negative electrode lead may be positioned at the same side in the longitudinal direction of the battery cell. The battery cell may be configured so that a plurality of unit cells, in each of which a positive electrode plate, a separator, and a negative electrode plate are arranged in order, or a plurality of bi-cells, in each of which a positive electrode plate, a separator, a negative electrode plate, a separator, a positive electrode plate, a separator, and a negative electrode plate are arranged in order, are stacked suitable for a battery capacity.

The battery cell stack 200 may be configured so that the plurality of battery cells are stacked on each other. The battery cells may have various structures, and the plurality of battery cells may be stacked in various ways.

The battery cell stack 200 may include a plurality of cartridges (not shown) for accommodating the battery cells 110. Each cartridge (not shown) may be fabricated by injection-molding of plastics, and a plurality of cartridges (not shown) having an accommodation portion for accommodating the battery cell may be stacked. A cartridge assembly in which a plurality of cartridges (not shown) are stacked may include a connector element or a terminal element. The connector element may include various types of electrical connecting components or connecting members for connecting to, for example, a battery management system (BMS) (not shown) capable of providing data on voltage or temperature of the battery cells. In addition, the terminal element includes a positive electrode terminal and a negative electrode terminal as main terminals connected to the battery cell, and the terminal element may have a terminal bolt to be electrically connected to the outside. Meanwhile, the battery cell may have various shapes.

The battery cell stack 200 is accommodated within the case 300, and referring to FIGS. 3 and 4, the battery cell stack 200 is provided to be coupled to the case 300 by a plurality of bolts 600 and a plurality of nuts 500. Referring to FIG. 3, for example, four nuts 500 are coupled to bolts 600 at edges of the case 300 to fix the battery cell stack 200 to the case 300.

The ICB cover 400 may electrically connect the battery cell stack 200. For example, a bus bar may be provided at the ICB cover 400, and the electrode lead 210 may be electrically connected to the bus bar provided at the ICB cover 400. The ICB cover 400 is fixedly coupled at an upper side of the battery cell stack 200 to allow only some of the plurality of bolts 600 and the plurality of nuts 500 are exposed to the outside. In other words, referring to FIG. 4, after the ICB cover 400 is coupled to the battery cell stack 200, if the battery module 100 is viewed from above, two nuts 500 among the four nuts 500 are exposed and thus are visible, but the other two nuts 510 are obstructed from view by the ICB cover 400 and thus are unseen. Since a predetermined number of nuts 510 are hidden by the ICB cover 400 as described above, the battery module 100 may be prevented from being disassembled by an unspecified person other than a manager. However, since it is impossible to disassemble the nut 510 hidden by the ICB cover 400 using a general disassembling tool 10, the manager is also unable to disassemble the battery module 100. Therefore, the nut 510 hidden by the ICB cover 400 is capable of being disassembled from the bolt 600 using the disassembling tool 10 described above. This will be explained below.

Referring to FIGS. 5 and 6, the coupling protrusion 310 may be formed on the case 300. When the coupling groove 51 is formed at the outer surface of the housing 50 of the disassembling tool 10 as described above, the coupling groove 51 formed at the housing 50 may be coupled to the coupling protrusion 310 of the case 300. In addition, a guide protrusion 320 may be formed at the case 300 to guide the movement of the disassembling tool 10 to allow the coupling groove 51 of the disassembling tool 10 to be easily coupled to the coupling protrusion 310. In other words, as a user inserts the disassembling tool 10 in any direction, the disassembling tool 10 is guided by the guide protrusion 320, and thus the housing 50 of the disassembling tool 10 moves along the guide protrusion 320 to allow the coupling groove 51 of the housing 50 to be coupled to the coupling protrusion 310 of the case 300. Accordingly, referring to FIGS. 5 and 6, the guide protrusion 320 may have a first rib 321 and a second rib 322.

The first rib 321 may have the same inclination as the inclination of the housing 50 of the disassembling tool 10. When the housing 50 contacts the first rib 321, the housing 50 may move along the first rib 321 and be placed on the nut 510 hidden by the ICB cover 400. In addition, the second rib 322 extends from the first rib 321 and may have an inclination angle different from the inclination angle of the first rib 321. For example, referring to FIGS. 5 and 6, the inclination angle of the second rib 322 may be set to be greater than the inclination angle of the first rib 321 with respect to the bottom portion of the case 300 forming an acute angle. Since the inclination angle of the second rib 322 is set to be greater than the inclination angle of the first rib 321, although the disassembling tool 10 is inserted in any direction, the disassembling tool 10 may avoid colliding or interfering with the second rib 322. In other words, even though the disassembling tool 10 is inserted in any direction, the disassembling tool 10 may be guided to the first rib 321 by the second rib 322 and guided to the hidden nut 510 by the first rib 321. In addition, as the housing 50 of the disassembling tool 10 moves along the guide protrusion 320, the coupling groove 51 formed at the housing 50 may be easily coupled to the coupling protrusion 310 formed on the case 300.

Referring to FIGS. 5 and 6, the first rotation member 20 may be coupled to the nut 510 hidden by the ICB cover 400 by means of the inclined housing 50 of the disassembling tool 10 described above. In particular, as the rotational force provided from the second rotation member 40 is transmitted to the first rotation member 20 via the connection shaft 30, the first rotation member 20 rotates to disassemble the nut 510 from the bolt 600 or fasten the nut 510 to the bolt 600.

Meanwhile, although it has been described in this exemplary embodiment that the coupling groove 51 is formed at the housing 50 of the disassembling tool 10 and the coupling protrusion 310 is formed on the case 300 of the battery module 100, a coupling protrusion (not shown) may be formed on the housing 50 of the disassembling tool 10, and a coupling groove (not shown) may be formed at the case 300 of the battery module 100.

Meanwhile, a battery pack (not shown) according to an exemplary embodiment of the present disclosure may include one or more battery modules 100 according to an exemplary embodiment of the present disclosure as described above. In addition to the battery modules 100, the battery pack (not shown) may further includes a pack case for accommodating the battery modules 100, and various devices for controlling charge and discharge of the battery modules 100, such as a BMS, a current sensor, a fuse, and the like.

The present disclosure has been described in detail. However, it should be understood that the detailed description and specific examples, while indicating preferred exemplary embodiments of the disclosure, are given by way of illustration only, since various changes and modifications within the scope of the disclosure will become apparent to those skilled in the art from this detailed description.

INDUSTRIAL APPLICABILITY

The present disclosure relates to a disassembling tool and a battery module requiring the use of the disassembling tool, and is particularly applicable to an industry related to a secondary battery.

What is claimed is:

1. A battery module using a disassembling tool, comprising:
- a battery cell stack having a plurality of battery cells provided with electrode leads such that the plurality of battery cells are stacked on each other;
- a case configured to accommodate the battery cell stack such that the battery cell stack is coupled to the case by a plurality of bolts and nuts;
- an interconnect board (ICB) cover fixedly coupled at an upper side of the battery cell stack so that only some of the plurality of bolts and nuts are exposed,
- a guide protrusion formed on the case, and
- a coupling protrusion formed on the case,
- wherein in the battery module, among the plurality of bolts and nuts, a nut hidden by the ICB cover is configured to be disassembled from the bolt by using the disassembling tool,
- wherein the guide protrusion is configured to guide the movement of the disassembling tool so that a coupling groove of the disassembling tool is coupled to the coupling protrusion.

2. The battery module using a disassembling tool according to claim 1,
wherein the guide protrusion includes:
a first rib having the same inclination as the inclination of the housing of the disassembling tool; and
a second rib extending from the first rib and having an inclination with an angle different from the first rib.

3. The battery module using a disassembling tool according to claim 2,
wherein the inclination angle of the second rib is greater than the inclination angle of the first rib with respect to a bottom portion of the case within a range of acute angle.

* * * * *